US012321496B2

(12) United States Patent
Larson et al.

(10) Patent No.: US 12,321,496 B2
(45) Date of Patent: Jun. 3, 2025

(54) AUTOMATED DATA MASKING WITH FALSE POSITIVE DETECTION AND AVOIDANCE

(71) Applicant: Capital One Services, LLC, McLean, VA (US)

(72) Inventors: Katherine Larson, Centreville, VA (US); Naga Deepak Chelluri, Ashburn, VA (US); Patrice Bramble, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/740,575

(22) Filed: Jun. 12, 2024

(65) Prior Publication Data

US 2024/0330514 A1    Oct. 3, 2024

Related U.S. Application Data

(63) Continuation of application No. 17/149,520, filed on Jan. 14, 2021, now Pat. No. 12,073,000.

(51) Int. Cl.
*G06F 21/62* (2013.01)
*G06F 16/2455* (2019.01)
(Continued)

(52) U.S. Cl.
CPC .... *G06F 21/6254* (2013.01); *G06F 16/24558* (2019.01); *G06F 21/604* (2013.01); *G06N 20/00* (2019.01)

(58) Field of Classification Search
CPC ........... G06F 16/2455; G06F 16/24558; G06F 21/604; G06F 21/6254; G06N 20/00
See application file for complete search history.

(56) References Cited

U.S. PATENT DOCUMENTS 7,669,051 B2 *  2/2010  Redlich ............... G06F 21/6254
                                                            713/166
8,256,006 B2 *  8/2012  Grzymala-Busse ........................
                                                     G06F 21/6245
                                                            726/26
(Continued)

FOREIGN PATENT DOCUMENTS

AU       2008323688 B2     4/2014

OTHER PUBLICATIONS

Shu X., et al., "Privacy-Preserving Detection of Sensitive Data Exposure," IEEE Transactions on Information Forensics and Security, May 2015, vol. 10(5), pp. 1092-1103.

*Primary Examiner* — Sharon S Lynch
(74) *Attorney, Agent, or Firm* — Harrity & Harrity, LLP (57) ABSTRACT

In some implementations, a system may receive a set of data intended for storage. The system may detect, within the set of data and using pattern matching, a set of potential sensitive data fields. The system may detect, using characters not included in the potential sensitive data fields, at least one non-sensitive data field included in the set of potential sensitive data fields. The system may mask first data included in the set of potential sensitive data fields other than the at least one non-sensitive data field and may refrain from masking second data included in the at least one non-sensitive data field. The system may generate a modified set of data based on masking the first data and refraining from masking the second data and output the modified set of data for storage.

20 Claims, 7 Drawing Sheets

(51) Int. Cl.
*G06F 21/60* (2013.01)
*G06N 20/00* (2019.01)

(56) References Cited

U.S. PATENT DOCUMENTS

| | | | | |
|---|---|---|---|---|
| 8,402,542 | B2* | 3/2013 | King | G06F 21/6218 726/23 |
| 8,468,244 | B2* | 6/2013 | Redlich | G06Q 50/18 715/255 |
| 8,650,642 | B2* | 2/2014 | Sallam | G06F 21/554 726/22 |
| 8,655,787 | B1* | 2/2014 | Griffin | H04L 63/00 705/64 |
| 8,655,939 | B2* | 2/2014 | Redlich | G06Q 10/06 709/212 |
| 8,752,181 | B2* | 6/2014 | Grzymala-Busse | G06F 21/6245 713/189 |
| 8,983,985 | B2 | 3/2015 | Chen et al. | |
| 9,235,562 | B1* | 1/2016 | Hart | G06F 18/211 |
| 9,552,272 | B1* | 1/2017 | Liang | G06F 11/3072 |
| 9,747,284 | B2* | 8/2017 | Marciano | G06F 40/47 |
| 9,825,925 | B2 | 11/2017 | Hore | |
| 10,032,046 | B1* | 7/2018 | Hayashi | H04L 63/0245 |
| 10,061,937 | B1* | 8/2018 | Hayashi | G06Q 10/107 |
| 10,291,657 | B2* | 5/2019 | Narayanaswamy | H04L 63/20 |
| 10,489,608 | B2 | 11/2019 | Cheng et al. | |
| 10,671,750 | B2* | 6/2020 | Parthasarathy | G06F 21/602 |
| 10,810,317 | B2* | 10/2020 | Williamson | G06F 21/604 |
| 10,812,531 | B2* | 10/2020 | Narayanaswamy | G06F 16/285 |
| 10,826,940 | B2* | 11/2020 | Narayanaswamy | H04L 63/12 |
| 10,831,927 | B2* | 11/2020 | Chakraborty | G06F 21/6254 |
| 10,979,458 | B2* | 4/2021 | Narayanaswamy | H04L 63/105 |
| 11,019,101 | B2* | 5/2021 | Narayanaswamy | G06F 21/6209 |
| 11,074,362 | B2* | 7/2021 | Conikee | G06F 21/577 |
| 11,263,335 | B2* | 3/2022 | Parthasarathy | G06F 16/24578 |
| 11,475,143 | B2* | 10/2022 | Williamson | G06N 5/025 |
| 11,755,754 | B2* | 9/2023 | Joshi | G06N 20/00 726/26 |
| 2005/0132070 | A1* | 6/2005 | Redlich | G06F 21/6209 709/228 |
| 2005/0138109 | A1* | 6/2005 | Redlich | G06F 21/6272 709/201 |
| 2005/0138110 | A1* | 6/2005 | Redlich | G06F 21/6254 709/201 |
| 2008/0168135 | A1* | 7/2008 | Redlich | G06F 16/23 709/204 |
| 2009/0106363 | A1* | 4/2009 | Fallen | G06F 11/0781 709/204 |
| 2009/0254572 | A1* | 10/2009 | Redlich | G06Q 10/10 |
| 2010/0024037 | A1* | 1/2010 | Grzymala-Busse | G06F 21/6245 707/E17.046 |
| 2011/0040983 | A1* | 2/2011 | Grzymala-Busse | G06F 21/6245 713/189 |
| 2011/0047619 | A1* | 2/2011 | King | G06F 21/6218 707/E17.014 |
| 2012/0255016 | A1* | 10/2012 | Sallam | G06F 21/566 726/24 |
| 2013/0018967 | A1* | 1/2013 | Gannu | H04L 67/535 709/224 |
| 2014/0164405 | A1 | 6/2014 | Tsai et al. | |
| 2015/0161397 | A1* | 6/2015 | Cook | G06F 21/60 726/26 |
| 2015/0286831 | A1 | 10/2015 | More et al. | |
| 2015/0363394 | A1* | 12/2015 | Marciano | G06F 40/40 704/2 |
| 2016/0277368 | A1* | 9/2016 | Narayanaswamy | H04L 63/123 |
| 2017/0264619 | A1* | 9/2017 | Narayanaswamy | G06F 21/6209 |
| 2017/0264640 | A1* | 9/2017 | Narayanaswamy | G06F 16/951 |
| 2018/0232528 | A1* | 8/2018 | Williamson | G06F 21/6245 |
| 2018/0367509 | A1 | 12/2018 | O'Hare et al. | |
| 2018/0367575 | A1* | 12/2018 | Narayanaswamy | G06F 16/285 |
| 2019/0156061 | A1* | 5/2019 | Chakraborty | H04L 63/0421 |
| 2019/0171846 | A1* | 6/2019 | Conikee | G06F 21/6245 |
| 2019/0268381 | A1* | 8/2019 | Narayanaswamy | H04L 63/12 |
| 2020/0057864 | A1* | 2/2020 | Parthasarathy | G06F 16/24578 |
| 2020/0067861 | A1* | 2/2020 | Leddy | G06F 21/6245 |
| 2020/0125746 | A1* | 4/2020 | Joshi | G06F 21/6245 |
| 2020/0177637 | A1* | 6/2020 | Narayanaswamy | H04L 63/104 |
| 2020/0311304 | A1* | 10/2020 | Parthasarathy | G06F 11/3006 |
| 2020/0410116 | A1* | 12/2020 | Williamson | G06N 20/00 |
| 2021/0097069 | A1* | 4/2021 | Schwartz | G06F 16/25 |
| 2021/0124800 | A1* | 4/2021 | Williams | G06F 40/295 |
| 2021/0226998 | A1* | 7/2021 | Narayanaswamy | G06F 21/6209 |
| 2022/0222372 | A1 | 7/2022 | Larson et al. | |
| 2023/0153462 | A1* | 5/2023 | Tutuianu | G06F 16/2462 726/26 |
| 2024/0354297 | A1* | 10/2024 | Schwartz | G06Q 10/08 |

* cited by examiner

AUTOMATED DATA MASKING WITH FALSE POSITIVE DETECTION AND AVOIDANCE

RELATED APPLICATION

This application is a continuation of U.S. patent application Ser. No. 17/149,520, filed Jan. 14, 2021, which is incorporated herein by reference in its entirety.

BACKGROUND

Sensitive fields may include personally identifiable information (PII), such as national identification numbers (e.g., social security numbers (SSNs) in the United States, social insurance numbers (SINs) in Canada, SSNs in the Philippines, permanent account numbers (PANs) in India, national insurance numbers (NINOs) in the United Kingdom, employer identification numbers (EINs) in the United States, individual taxpayer identification numbers (ITINs) in the United States, tax identification numbers (TINs) in Costa Rica, and/or other unique or quasi-unique identification numbers), credit card numbers, bank account numbers, passport numbers, and/or other PII. Data that includes sensitive fields should either be encrypted or should be masked when stored. For example, a masking system may replace sensitive fields with 'X's or other characters in order to prevent the sensitive fields from being stored.

SUMMARY

In some implementations, a system for automatically masking sensitive data and detecting and avoiding false positives includes one or more memories and one or more processors, communicatively coupled to the one or more memories, configured to receive a set of data intended for inclusion in a data store; detect, within the set of data and using a detection model, potential sensitive data fields, wherein the detection model is configured using at least one of: data type matching that identifies a correspondence between one or more stored data types and one or more data types associated with the potential sensitive data fields, pattern matching that identifies a correspondence between one or more stored data patterns and one or more data patterns included in the potential sensitive data fields; detect, within the potential sensitive data fields and using a false positive model, at least one non-sensitive data field, wherein the false positive model is configured using contextual analysis that determines whether one or more stored characters, phrases, or data patterns correspond to one or more characters, phrases, or data patterns included in the set of data; modify the set of data to mask the potential sensitive data fields other than the at least one non-sensitive data field; and output the modified set of data to the data store.

In some implementations, a method of automatically masking sensitive data and detecting and avoiding false positives includes receiving, by a device, a set of data intended for storage; detecting, by the device and within the set of data and using pattern matching, a set of potential sensitive data fields; detecting, by the device and using characters not included in the potential sensitive data fields, at least one non-sensitive data field included in the set of potential sensitive data fields; masking, by the device, first data included in the set of potential sensitive data fields other than the at least one non-sensitive data field; refraining from masking, by the device, second data included in the at least one non-sensitive data field; generating, by the device, a modified set of data based on masking the first data and refraining from masking the second data; and outputting, by the device, the modified set of data for storage.

In some implementations, a non-transitory computer-readable medium storing a set of instructions for masking sensitive data and detecting and avoiding false positives includes one or more instructions that, when executed by one or more processors of a device, cause the device to provide at least one first function that receives a set of data as input, detects potential sensitive data fields within the set of data using at least one of pattern matching or data type matching, and outputs the potential sensitive data fields; provide at least one second function that receives the potential sensitive data fields as input, detects at least one non-sensitive data field within the potential sensitive data fields using contextual analysis, and outputs the at least one non-sensitive data field; and provide at least one third function that modifies the set of data to mask the potential sensitive data fields other than the at least one non-sensitive data field and outputs the modified set of data.

DETAILED DESCRIPTION

The following detailed description of example implementations refers to the accompanying drawings. The same reference numbers in different drawings may identify the same or similar elements.

Sensitive fields, such as PII, may be masked before data that includes those sensitive fields is stored. For example, a system may use non-sensitive portions of the data such that the sensitive fields should be masked for security. Additionally, or alternatively, a system may lack sufficient encryption (e.g., according to legal rules, such as the Health Insurance Portability and Accountability Act (HIPAA), the General Data Protection Regulation (GDPR), and/or other laws and rules) such that the sensitive fields should be masked.

Tools have been developed to automatically mask sensitive data. For example, these tools may use pattern recognition, machine learning, or other computerized techniques to detect sensitive fields, which are then masked (e.g., by replacing sensitive fields with 'X's or other characters). However, even the most accurate of these tools result in false positives. For example, portions of addresses, Internet logs, phone numbers, and/or other non-sensitive fields are often masked by these tools.

By implementing separate false positive detection after sensitive field detection, accuracy of automatic masking can be increased beyond existing automated tools. Some implementations described herein enable explicit false positive detection when automatically masking sensitive fields. As a result, sensitive fields may be masked faster and more accurately than existing techniques. Additionally, output does not need to be manually corrected for false positive errors that existing techniques produce.

Additionally, automated masking tools are generally executables or scripts that are applied to mask sensitive fields included in already-stored data. However, this results in the data being insecure during initial transfer into a storage and during the time between transfer into the storage and completion of the masking. Accordingly, some implementations described herein provide a portable library of masking functions that can be implemented into a transfer procedure. As a result, data may be masked as it is transferred into a storage such that the data is more secure because it is not exposed during initial transfer or during a time between transfer and masking. Additionally, data may be masked as it is transferred to a user device or other computing device for display. Accordingly, the data is secured because it is not exposed during transfer to the user device.

Figure 1A:
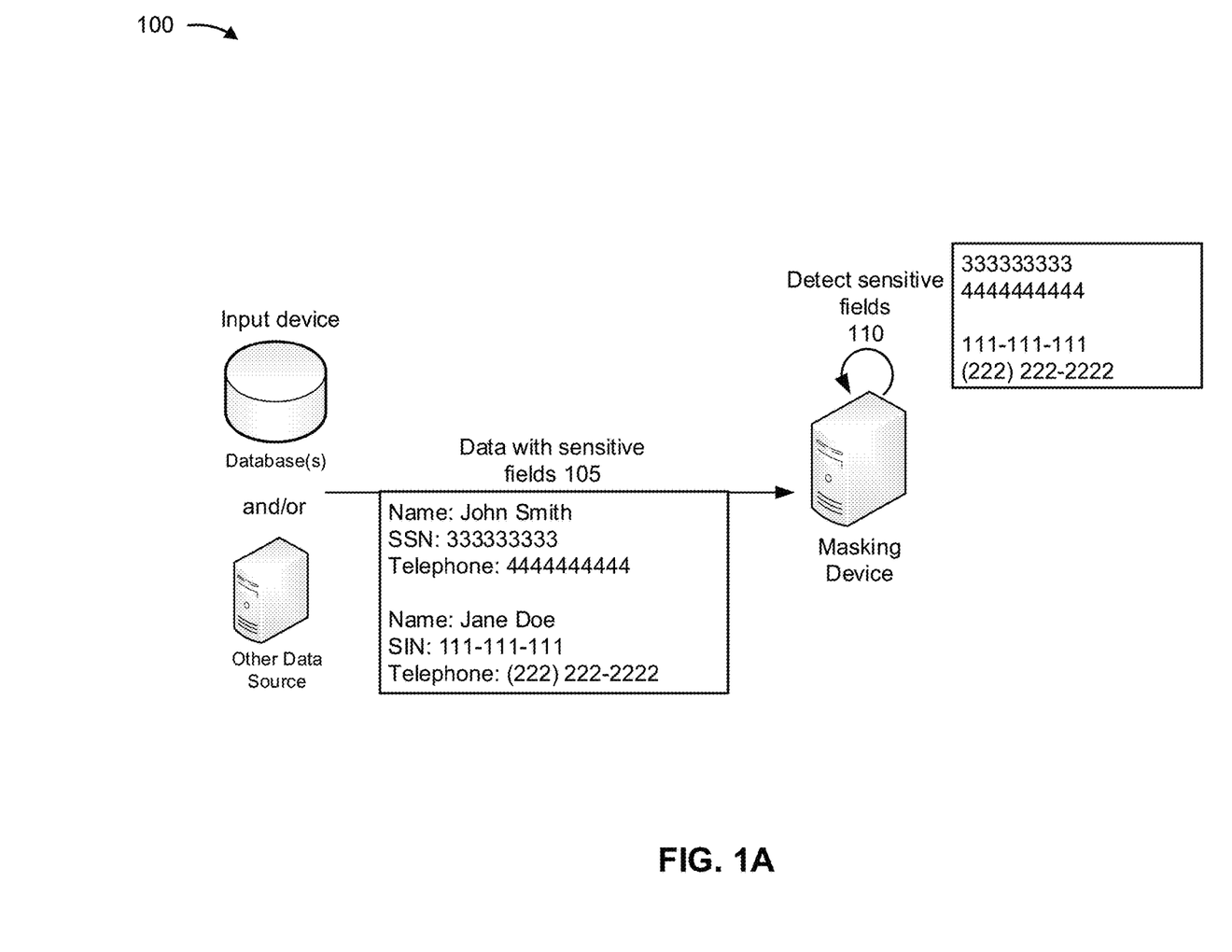
FIGS. 1A-1B are diagrams of an example implementation relating to automated data masking with false positive detection and avoidance.
Figure 1B:
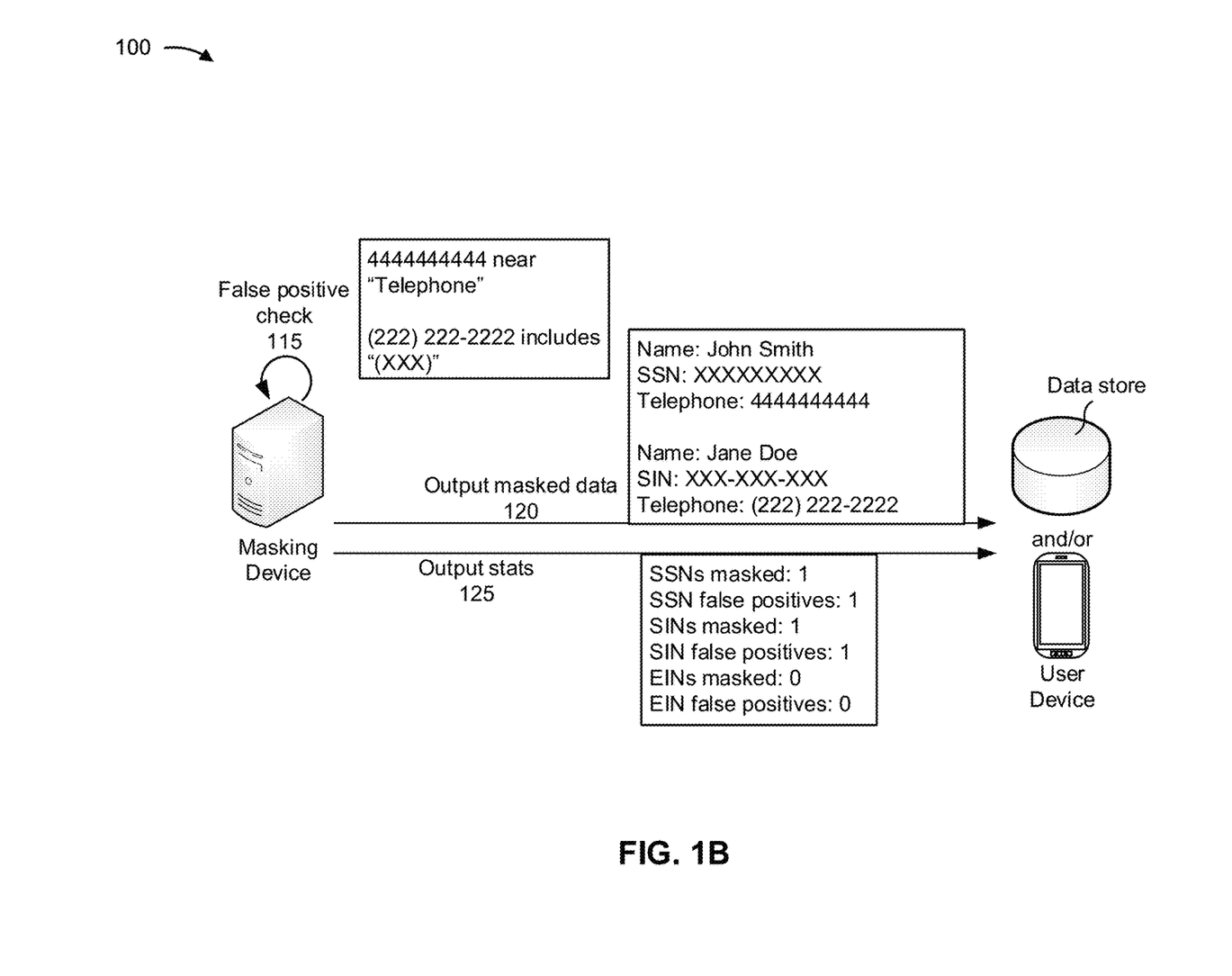

FIGS. 1A-1B are diagrams of an example 100 associated with automated data masking with false positive detection and avoidance. As shown in FIGS. 1A-1B, example 100 includes an input device (e.g., one or more databases and/or other data source), a masking device, a data store, and a user device. These devices are described in more detail in connection with FIGS. 4 and 5.

As shown by reference number 105, the masking device may receive a set of data intended for storage (e.g., in a remote and/or local data store). For example, the masking device may receive the set of data from a database (e.g., a relational database, a graphical database, and/or another database) and/or another data source (e.g., a cloud-based storage and/or a local storage). The set of data may include sensitive fields and non-sensitive fields. In example 100, the set of data includes one tuple with a name ("John Smith"), an SSN ("333333333"), and a telephone number ("4444444444") and another tuple with a name ("Jane Doe"), an SIN ("111-111-111"), and a telephone number ("(222) 222-2222"). Accordingly, the SSN and the SIN may be sensitive fields, and the names and telephone numbers may be non-sensitive fields.

In some implementations, the masking device receives the set of data based on user input prior to being provided to a storage device (e.g., a remote and/or local storage device) or provided to the user device (e.g., for display or other use). For example, a user may instruct the database and/or other data source to provide the set of data to the masking device. The user may send the instruction, via a user device, to the database and/or other data source (e.g., as a push request) and/or to the masking device (e.g., as a pull request). Additionally, or alternatively, a server or other computing device may provide the set of data to the masking device with instructions to modify the set of data before outputting to a storage device (e.g., a remote and/or local storage device) or outputting to the user device (e.g., for display or other use).

As shown by reference number 110, the masking device may detect, within the set of data and using a detection model, a set of potential sensitive data fields. In some implementations, the detection model may include data type matching that identifies a correspondence between one or more stored data types and one or more data types associated with the set of potential sensitive data fields. For example, the detection model may identify SSNs, SINs, bank account numbers, credit card numbers, and/or other sensitive fields by identifying potential sensitive data fields that include numbers. Accordingly, the detection model may determine a first data type match. In another example, the detection model may identify driver's license identifiers, passport identifiers, and/or other sensitive fields by identifying potential sensitive data fields that include alphanumeric characters. Accordingly, the detection model may determine a second data type match. Although described above using a first data type match and a second data type match, the description similarly applies to additional data type matches (e.g., a third data type match, a fourth data type match, and so on).

Additionally, or alternatively, the detection model may include pattern matching that identifies a correspondence between one or more stored data patterns and one or more data patterns included in the set of potential sensitive data fields. For example, the detection model may identify SSNs by identifying potential sensitive data fields that correspond to a pattern of three numbers, two numbers, and four numbers (e.g., "###-##-####" or "#########" or "######"). In another example, the detection model may identify EINs by identifying potential sensitive data fields that correspond to a pattern of two numbers and seven numbers, with one or three additional characters (e.g., "##-#######" or "##-#######A" or "##-##########"). In yet another example, the detection model may identify bank account numbers by identifying potential sensitive data fields that correspond to a pattern of ten numbers or twelve numbers (e.g., "##########" or "############"). In example 100, the detection model identified two fields from one tuple ("333333333" and "4444444444") as potential sensitive data fields and two fields from another tuple ("111-111-111" and "(202) 222-2222") as potential sensitive data fields.

In some implementations, the detection model may include a trained machine learning model. For example, the detection model may be trained as described below in connection with FIG. 3.

In some implementations, the detection model may use pattern detection based on one or more first patterns to identify a first subset of the potential sensitive data fields and pattern detection based on one or more second patterns to identify a second subset of the potential sensitive data fields. For example, as described above, the detection model may use first patterns to identify SSNs (e.g., "###-##-####" or "#########" or "#########") and second patterns to identify EINs (e.g., "##-#######" or "##-#######A" or "##-##########"). Although described below using one or more first patterns and one or more second patterns, the description similarly applies to additional patterns (e.g., one or more third patterns, one or more fourth patterns, and so on). For example, as described above, the detection model may use first patterns to identify SSNs (e.g., "###-##-####" or "#########" or "#########"), second patterns to identify EINs (e.g., "##-#######" or "##-#######A" or "####"), and third patterns to identify bank account numbers (e.g., "##########" or "############").

In some implementations, the system may receive, from a user, an indication of the one or more first patterns and an indication of the one or more second patterns. For example, the user may provide the indications when, as described above, sending the instruction, via the user device, to the database and/or other data source (e.g., as a push request) and/or to the masking device (e.g., as a pull request). As an alternative, the user may provide the indications to the masking device separately (e.g., as arguments to function calls that are received by the masking device). In some implementations, a server or other computing device may indicate the one or more first patterns and the one or more second patterns to the masking device. For example, the server may provide the indications when, as described above, sending the instruction for the masking device to modify the set of data before outputting to a storage device or to the user device. As an alternative, the server may provide the indications to the masking device separately (e.g., as arguments to function calls that are received by the masking device).

In some implementations, the detection model may be further configured using keyword matching that identifies a correspondence between one or more stored phrases and one or more phrases included in the set of data. For example, the detection model may identify bank account numbers by further identifying one or more stored phrases (e.g., "account" or "acct.") within a character threshold of a potential sensitive data field. Accordingly, the detection model may identify a potential sensitive data field based on data type matching (e.g., identifying the potential sensitive data field as including numbers) and/or pattern matching (e.g., identifying the potential sensitive data field that corresponds to a pattern of ten numbers or twelve numbers) in combination with keyword matching (e.g., identifying "account" or "acct." within a threshold quantity of characters of a terminal character, a median character, and/or another character included in the potential sensitive data field).

As shown in FIG. 1B, and by reference number 115, the masking device may detect, within the set of potential sensitive data fields and using a false positive model, one or more non-sensitive data fields. In some implementations, the false positive model may be configured using contextual analysis that determines whether one or more stored characters, phrases, or data patterns correspond to one or more characters, phrases, or data patterns included in the set of data. In one example, the contextual analysis may include identifying one or more stored characters adjacent to the potential sensitive data fields. For example, the masking device may identify a decimal point before an initial character of a potential sensitive data field or after a terminal character of the potential sensitive data field and thus detect that potential sensitive data field as a non-sensitive data field. In another example, the masking device may identify a hypertext transfer protocol (HTTP) identifier such as "HTTP/" or "http://" or another set of characters indicative of a network log before an initial character of a potential sensitive data field or after a terminal character of the potential sensitive data field and detect that potential sensitive data field as a non-sensitive data field.

Additionally, or alternatively, the contextual analysis may include identifying one or more stored words or phrases within a threshold quantity of characters of the potential sensitive data fields. For example, the masking device may identify one or more words or phrases indicative of an address (e.g., "Street" or "Unit") within a threshold quantity of characters of an initial character, a terminal character, or another character of a potential sensitive data field and thus detect that potential sensitive data field as a non-sensitive data field. In another example, the masking device may identify one or more words or phrases indicative of a telephone number (e.g., "Telephone" or "Meeting ID") within a threshold quantity of characters of an initial character, a terminal character, or another character of a potential sensitive data field and thus detect that potential sensitive data field as a non-sensitive data field. In example 100, the masking device identified one potential sensitive data field ("4444444444") as a non-sensitive data field based on the phrase "Telephone" being near that potential sensitive data field.

Additionally, or alternatively, the contextual analysis may include identifying one or more stored data patterns within another threshold quantity of characters of the potential sensitive data fields. For example, the masking device may identify one or more patterns indicative of an address (e.g., a two-letter abbreviation for a U.S. state, such as "CA" or "VA"; a direction, such as "West" or "W"; or a five-digit U.S. zip code, such as "20001") within a threshold quantity of characters of an initial character, a terminal character, or another character of a potential sensitive data field and thus detect that potential sensitive data field as a non-sensitive data field. In another example, the masking device may identify one or more patterns indicative of a telephone number (e.g., a three digit area code surrounded by parentheses, such as "(###)") within a threshold quantity of characters of an initial character, a terminal character, or another character of a potential sensitive data field and thus detect that potential sensitive data field as a non-sensitive data field. In example 100, the masking device identified one potential sensitive data field ("(222) 222-2222") as a non-sensitive data field based on the pattern "(###)" being included in that potential sensitive data field.

In some implementations, the contextual analysis may apply to a set of characters not included in the set of potential sensitive data fields. In example 100, the masking device identified one potential sensitive data field ("4444444444") as a non-sensitive data field based on characters not included in that potential sensitive data field. Additionally, or alternatively, the contextual analysis may apply to at least some characters included in the set of potential sensitive data fields. In example 100, the masking device identified one potential sensitive data field ("(222) 222-2222") as a non-sensitive data field based on characters included in that potential sensitive data field.

As described above, in some implementations, the detection model may use pattern detection based on one or more first patterns to identify a first subset of the potential sensitive data fields and pattern detection based on one or more second patterns to identify a second subset of the potential sensitive data fields. Accordingly, the false positive model may apply contextual analysis to a first set of characters that is not included in the first subset of the potential sensitive data fields and that is based on the one or more first patterns. Similarly, the false positive model may apply contextual analysis to a second set of characters that is not included in the second subset of the potential sensitive data fields and that is based on the one or more second patterns. For example, the detection model may use first patterns to identify bank account numbers (e.g., ### or #### such that the false positive model may search for decimal points in a first set of characters that includes a character preceding the initial character of a potential sensitive data field and a character following the terminal character of the potential sensitive data field. Similarly, the detection model may use second patterns to identify SINs (e.g., "###-###-###" or "#########") such that the false positive model may search for words or phrases indicative of an address and/or patterns indicative of an address in a second set of characters that includes 10 characters preceding the initial character of a potential sensitive data field and 25 characters following the terminal character of the potential sensitive data field.

As shown by reference number 120, the masking device may modify the set of data to mask the set of potential sensitive data fields other than the non-sensitive data field (s). For example, the masking device may replace characters within the set of potential sensitive data fields, other than the non-sensitive data field(s), with nonce characters. In some implementations, the masking device may mask first data included in the set of potential sensitive data fields other than the non-sensitive data field(s) and refrain from masking second data included in the non-sensitive data field(s). In example 100, the numbers in the potential sensitive data fields other than the non-sensitive data fields (the "SSN" field and the "SIN" field in example 100) were replaced with Xs, and the non-sensitive data fields (the "Telephone" fields in example 100) were not masked. Accordingly, the masking device may generate a modified set of data based on masking the first data and refraining from masking the second data.

As further shown by reference number 120, the masking device may output the modified set of data for storage. For example, the masking device may transmit (e.g., via one or more computer networks) the modified set of data to the data store (or other storage device). Additionally, or alternatively, the masking device may transmit (e.g., via one or more computer networks) the modified set of data to the user device (e.g., for display or other use). In some implementations, the masking device may additionally delete the set of data without providing the set of data to the data store (and/or the user device). For example, the masking device may delete the set of data from a random access memory (RAM) or other temporary storage after masking in order to keep the set of potential sensitive data fields, other than the non-sensitive data field(s), secure.

In some implementations, and as shown by reference number 125, the masking device may track a quantity associated with the set of potential sensitive data fields and/or a quantity associated with the non-sensitive data field(s). For example, the masking device may track a total quantity of potential sensitive data fields that were masked and/or a corresponding quantity for each type of potential sensitive field that was masked. In example 100, the masking device has tracked that one SSN was masked, one SIN was masked, and zero EINs were masked. Additionally, or alternatively, the masking device may track a total quantity of non-sensitive data fields that were detected (and not masked) and/or a corresponding quantity for each type of non-sensitive data field that was detected (and not masked). In example 100, the masking device has tracked that one false positive SSN was detected, one false positive SIN was detected, and zero false positive EINs were detected.

As further shown by reference number 125, the masking device may output an indication based on the quantity associated with the set of potential sensitive data fields and/or the quantity associated with the non-sensitive data field(s). For example, the masking device may output the indication to the user device. The user device may be associated with an administrator of the masking device and/or with the user that instructed the database and/or other data source (e.g., with a push request) and/or the masking device (e.g., with a pull request), as described above. Additionally, or alternatively, the masking device may output the indication to the data store (or other storage device). The indication may include a textual output for display (e.g., on a graphical user interface (GUI) or on a command line) and/or a log file (e.g., for storage on the data store and/or a remote machine, locally on the masking device, and/or locally on the user device).

By using the techniques described above, the masking device can implement separate false positive detection after sensitive field detection. As a result, the masking device increases accuracy of automatic masking beyond that of existing automated tools. Thus, sensitive fields are masked faster and more accurately, and the output does not need to be manually corrected for false positive errors. This, in turn, conserves computing and networking resources that would otherwise have been wasted in correcting false positives, attempting to recover any information lost when false positives were inadvertently masked, training the software to reduce future false positives, and so on.

As indicated above, FIGS. 1A-1B are provided as an example. Other examples may differ from what is described with regard to FIGS. 1A-1B.

Figure 2:
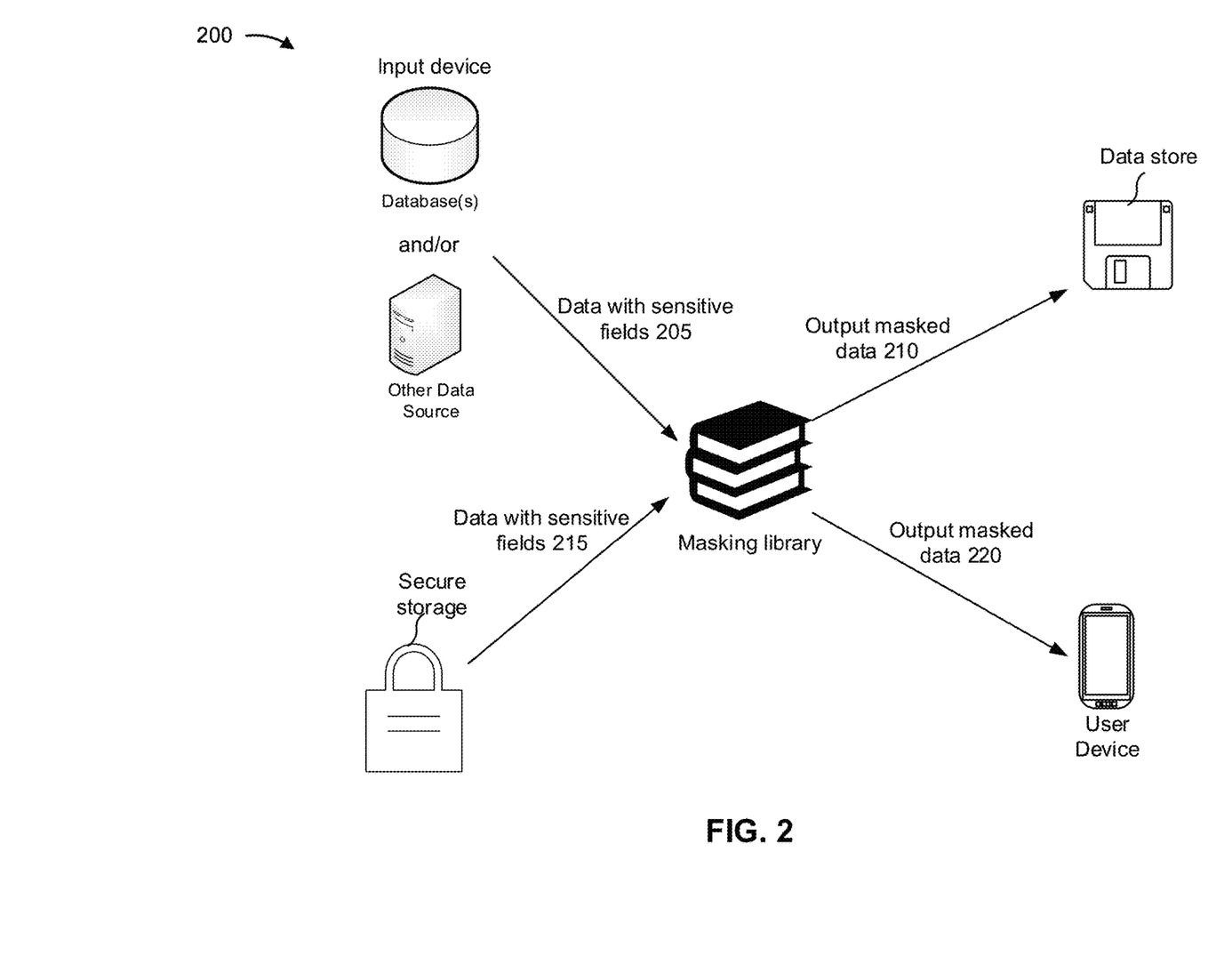
FIG. 2 is a diagram of an example library for use in systems and/or methods described herein.

FIG. 2 is a diagram of an example 200 associated with a masking library that performs automated data masking with false positive detection and avoidance. As shown in FIG. 2, example 200 includes a masking library, which may be partially or wholly included in a masking device, as described above in connection with FIGS. 1A-1B.

The masking library may include a flexible library of functions, such as a Python® library, a Java® library, a dynamic-link library (dll) file for a Windows® implementation, a dynamic library (dylib) for a Unix® implementation, and/or another library of functions. In some implementations, the masking library may provide a first function that receives a set of data as input, detects potential sensitive data fields within the set of data using at least one of pattern matching or data type matching, and outputs the potential sensitive data fields. For example, the first function may detect the potential sensitive data fields as described above in connection with FIG. 1A. The masking library may further provide a second function that receives the potential sensitive data fields as input, detects one or more non-sensitive data fields within the potential sensitive data fields using contextual analysis, and outputs the non-sensitive data field(s). For example, the second function may detect the non-sensitive data field(s) as described above in connection with FIG. 1B. The masking library may also provide a third function that modifies the set of data to mask the potential sensitive data fields other than the non-sensitive data field(s) and outputs the modified set of data. For example, the third function may modify the set of data and output the modified set of data as described above in connection with FIG. 1B.

In some implementations, the masking library may provide multiple first functions. For example, one first function may apply pattern detection based on one or more first patterns to identify a first subset of potential sensitive data fields, and another first function may apply pattern detection based on one or more second patterns to identify a second subset of potential sensitive data fields. Although described above using two first functions, the description similarly applies to additional first functions. For example, the masking library may provide another first function that applies pattern detection based on one or more third patterns to identify a third subset of potential sensitive data fields, yet another first function that applies pattern detection based on one or more fourth patterns to identify a fourth subset of potential sensitive data fields, and so on.

In some implementations, the masking library may select the one or more first patterns based on a first data type match between a first stored data type and a data type associated with the first subset. For example, the masking library may identify a potential sensitive data field as including numbers and thus apply pattern detection using first patterns associated with SSNs, SINs, bank account numbers, and/or other similar sensitive fields. Similarly, the masking library may select the one or more second patterns are selected based on a second data type match between a second stored data type and a data type associated with the second subset. For example, the masking library may identify a potential sensitive data field as including alphanumeric characters and thus apply pattern detection using first patterns associated with driver's license identifiers, passport identifiers, and/or other similar sensitive fields.

As an alternative, the masking library may select, based on input from a user, which first functions to apply to the set of data. For example, the user may provide different function arguments and/or execute different function calls to select some first functions (and thus some patterns) to apply to the set of data while not applying other first functions (and thus not other patterns) to the set of data. Accordingly, the user may customize application of the masking library based on which sensitive fields the user expects to be included in the set of data.

In some implementations, the masking library may further provide multiple second functions. For example, one second function may apply contextual analysis to a first set of characters not included in the first subset of potential sensitive data fields. Similarly, the masking library may provide another second function that applies contextual analysis to a second set of characters not included in the second subset of potential sensitive data fields. Although described above using two second functions, the description similarly applies to additional second functions. For example, the masking library may provide another second function that applies contextual analysis to a third set of characters not included in a third subset of potential sensitive data fields, yet another second function that applies contextual analysis to a fourth set of characters not included in a fourth subset of potential sensitive data fields, and so on.

In some implementations, the masking library may select which second functions to apply to the potential sensitive data fields based on which first functions were applied to the set of data. For example, the masking library may call a corresponding second function when a first function identifies one or more potential sensitive data fields as SSNs. Similarly, the masking library may call a different corresponding second function when a different first function identifies one or more potential sensitive data fields as credit card numbers.

The at least one first function, the at least one second function, and the at least one third function may be called by an importing process associated with a cloud storage. For example, as shown by reference numbers 205 and 210, functions of the masking library may be called by a database and/or other data source such that the masking library may mask potential sensitive data fields other than one or more non-sensitive data fields within a set of data that is being transferred to a data store (or other storage device). In another example, and as shown by reference numbers 215 and 220, functions of the masking library may be called by a secure storage (e.g., an encrypted database and/or other secured storage) such that the masking library may mask potential sensitive data fields other than one or more non-sensitive data fields within a set of data that is being transferred to a user device (or other unsecured device).

In some implementations, the masking library may further provide a function that tracks (and/or may track while executing the first function(s), second function(s), and/or third function(s) described above) one or more quantities associated with the potential sensitive data fields and/or the non-sensitive data field(s). Accordingly, the masking library may output, based on the one or more quantities, an indication, as described above in connection with FIG. 1B.

By using the techniques described above, the masking library can implement separate false positive detection after sensitive field detection. As a result, the masking library can increase accuracy of automatic masking beyond that of existing automated tools. This, in turn, conserves computing and networking resources that would otherwise have been wasted in correcting false positives, attempting to recover any information lost when false positives were inadvertently masked, training the software to reduce future false positives, and so on. Additionally, the masking library may be portable such that the functions described above can be implemented into a data transfer procedure. As a result, data may be masked as it is transferred into a storage such that the data is more secure because it is not exposed during initial transfer or during a time between transfer and masking. This, in turn, conserves computing and networking resources that would otherwise have been wasted in losing information caused by a security breach of the sensitive data fields, discovering the security breach, attempting to recover the lost sensitive data fields, training security analysts to prevent future breaches of the software code, and so on. Additionally, data may be masked as it is transferred to a user device or other computing device for display. Accordingly, the data is secured because it is not exposed during transfer to the user device. This, in turn, conserves computing and networking resources that would otherwise have been wasted in losing information caused by a man-in-the-middle attack between a secure storage and the user device, discovering the man-in the-middle attack, attempting to recover the lost sensitive data fields, training security analysts to prevent future man-in the-middle attacks, and so on.

As indicated above, FIG. 2 is provided as an example. Other examples may differ from what is described with regard to FIG. 2.

Figure 3:
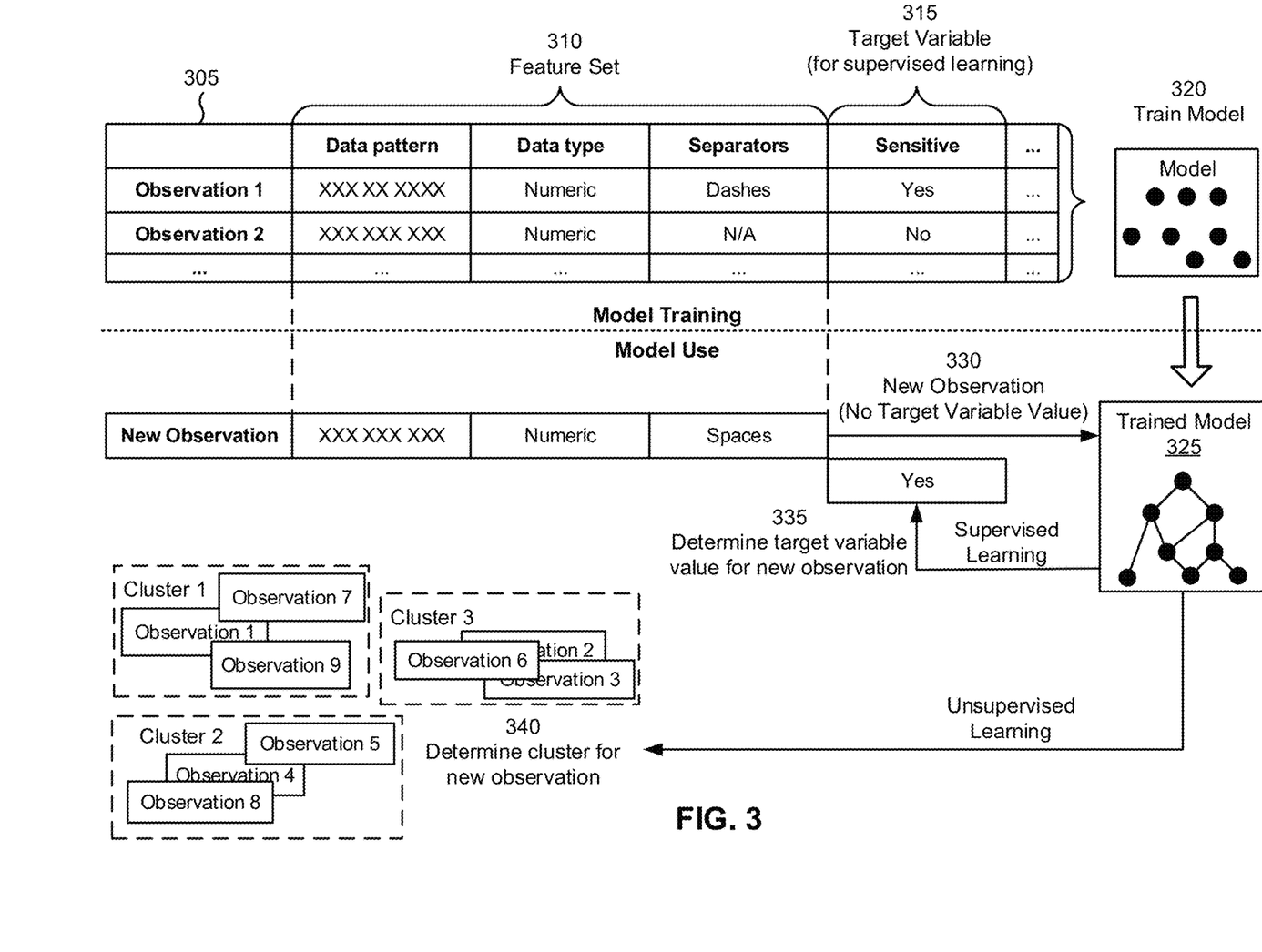
FIG. 3 is a diagram illustrating an example of training and using a machine learning model for use in systems and/or methods described herein.

FIG. 3 is a diagram illustrating an example 300 of training and using a machine learning model in connection with automated data masking. The machine learning model training and usage described herein may be performed using a machine learning system. The machine learning system may include or may be included in a computing device, a server, a cloud computing environment, or the like, such as the cloud computing system 402 described in more detail elsewhere herein.

As shown by reference number 305, a machine learning model may be trained using a set of observations. The set of observations may be obtained from training data (e.g., historical data), such as data gathered during one or more processes described herein. In some implementations, the machine learning system may receive the set of observations (e.g., as input) from input device 410 and/or secure storage 440, as described elsewhere herein.

As shown by reference number 310, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from input device 410 and/or secure storage 440. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature indicating a data pattern, a second feature indicating a data type, a third feature indicating one or more separators, and so on. As shown, for a first observation, the first feature may indicate a pattern of XXX XX XXXX, the second feature may indicate a numeric data type, the third feature may indicate that dashes are used as separators, and so on. These features and feature values are provided as examples and may differ in other examples. For example, the feature set may include one or more of the following features: a feature indicating nearby words or phrases, a feature indicating nearby characters, and so on.

As shown by reference number 315, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 300, the target variable is a Boolean, which has a value of true (or "Yes") for the first observation. The target variable may indicate whether a data field associated with the feature set is classified as sensitive.

The feature set and target variable described above are provided as examples, and other examples may differ from what is described above. For example, for a target variable of false (or "No"), the feature set may include a first feature indicating a pattern of XXX XXX XXX, a second feature indicating a numeric data type, and a third feature indicating that no separators are used (thus "N/A" or another null value).

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 320, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 325 to be used to analyze new observations.

As shown by reference number 330, the machine learning system may apply the trained machine learning model 325 to a new observation, such as by receiving a new observation and inputting the new observation to the trained machine learning model 325. As shown, the new observation may include a first feature indicating a pattern of XXX XXX XXX, a second feature indicating a numeric data type, a third feature indicating that spaces are used as separators, and so on, as an example. The machine learning system may apply the trained machine learning model 325 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 325 may predict a value of true for the target variable for the new observation, as shown by reference number 335. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a recommendation to mask the sensitive field associated with the new observation. The first automated action may include, for example, masking the sensitive field associated with the new observation.

As another example, if the machine learning system were to predict a value of false for the target variable, then the machine learning system may provide a second (e.g., different) recommendation (e.g., to refrain from masking the sensitive field associated with the new observation) and/or may perform or cause performance of a second (e.g., different) automated action (e.g., retaining content of the sensitive field associated with the new observation).

In some implementations, the trained machine learning model 325 may classify (e.g., cluster) the new observation in a cluster, as shown by reference number 340. The observations within a cluster may have a threshold degree of similarity. As an example, if the machine learning system classifies the new observation in a first cluster (e.g., potentially sensitive fields), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., not potentially sensitive fields), then the machine learning system may provide a second (e.g., different) recommendation (e.g., the second recommendation described above) and/or may perform or cause performance of a second (e.g., different) automated action, such as the second automated action described above.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to detecting potential sensitive data fields (e.g., as described above in connection with FIG. 1A). Explicit false positive detection (e.g., as described above in connection with FIG. 1B) may be applied to the machine learning system in order to increase accuracy of the system beyond that achievable using training alone, as described above. As a result, computing and networking resources may be conserved that would otherwise have been consumed in correcting false positives, attempting to recover any information lost when false positives were inadvertently masked, conducting additional machine learning to reduce future false positives, and so on.

As indicated above, FIG. 3 is provided as an example. Other examples may differ from what is described in connection with FIG. 3.

Figure 4:
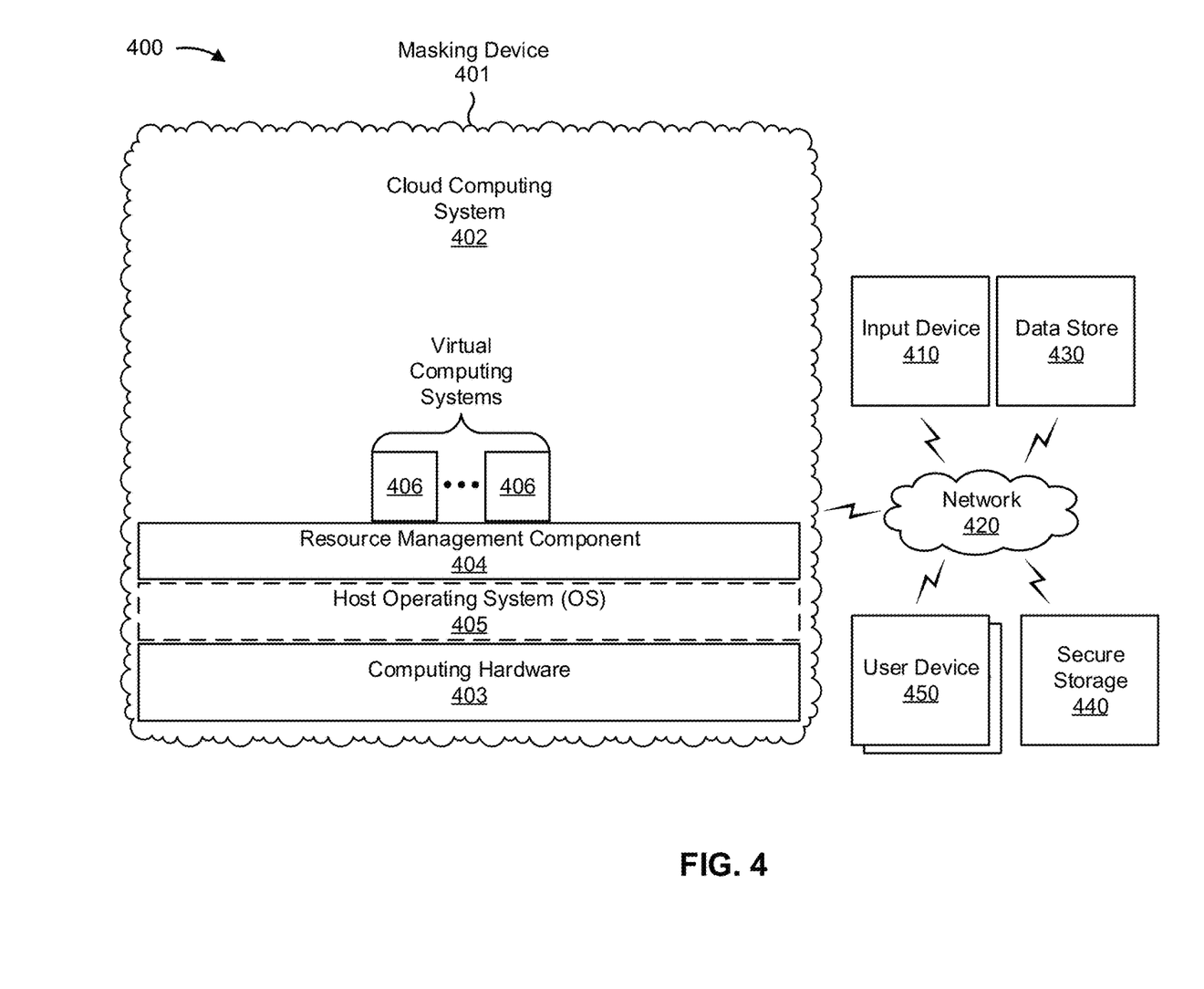
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a masking device 401, which may include one or more elements of and/or may execute within a cloud computing system 402. The cloud computing system 402 may include one or more elements 403-406, as described in more detail below. As further shown in FIG. 4, environment 400 may include an input device 410, a network 420, a data store 430, a secure storage 440, and/or a user device 450. Devices and/or elements of environment 400 may interconnect via wired connections and/or wireless connections.

The cloud computing system 402 includes computing hardware 403, a resource management component 404, a host operating system (OS) 405, and/or one or more virtual computing systems 406. The resource management component 404 may perform virtualization (e.g., abstraction) of computing hardware 403 to create the one or more virtual computing systems 406. Using virtualization, the resource management component 404 enables a single computing device (e.g., a computer, a server, and/or the like) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server) or from multiple computing devices (e.g., multiple servers), such as multiple computing devices in one or more data centers. Computer hardware 403 may include one or more processors, one or more memories, one or more storage components, and/or one or more networking components, examples of which are described elsewhere herein.

The resource management component 404 includes a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, and/or the like) or a virtual machine monitor, such as when the virtual computing systems 406 are virtual machines. Additionally, or alternatively, the resource management component 404 may include a container manager, such as when the virtual computing systems 406 are containers. In some implementations, the resource management component 404 executes within and/or in coordination with a host operating system 405.

A virtual computing system 406 includes a virtual environment that enables cloud-based execution of operations and/or processes described herein using computing hardware 403. A virtual computing system 406 may execute one or more applications using a file system that includes binary files, software libraries, and/or other resources required to execute applications on a guest operating system (e.g., within the virtual computing system 406) or the host operating system 405.

Although the masking device 401 may include one or more elements 403-406 of the cloud computing system 402, may execute within the cloud computing system 402, and/or may be hosted within the cloud computing system 402, in some implementations, the masking device 401 may not be cloud-based (e.g., may be implemented outside of a cloud computing system) or may be partially cloud-based. For example, the masking device 401 may include one or more devices that are not part of the cloud computing system 402, such as device 500 of FIG. 5, which may include a standalone server or another type of computing device. The masking device 401 may perform one or more operations and/or processes described in more detail elsewhere herein.

Input device 410 may be implemented on a cloud computing system at least partially integrated with cloud computing system 402 (e.g., as computing hardware 403) or distinct from cloud computing system 402 (e.g., as a standalone server). In some implementations, the input device 410 may include one or more devices (e.g., one or more servers) that are not part of a cloud computing system, such as device 500 of FIG. 5, which may include a standalone server or another type of computing device. The input device 410 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The input device 410 may provide a set of data to a masking device and/or a masking library for output to a storage device, as described elsewhere herein.

Network 420 includes one or more wired and/or wireless networks. For example, network 420 may include a cellular network, a public land mobile network (PLMN), a local area network (LAN), a wide area network (WAN), a private network, the Internet, and/or the like, and/or a combination of these or other types of networks. The network 420 enables communication among the devices of environment 400.

Data store 430 may be implemented on a cloud computing system at least partially integrated with cloud computing system 402 (e.g., as computing hardware 403) or distinct from cloud computing system 402 (e.g., as a standalone server). In some implementations, the data store 430 may include one or more devices (e.g., one or more servers) that are not part of a cloud computing system, such as device 500 of FIG. 5, which may include a standalone server or another type of computing device. The data store 430 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data store 430 may receive modified data for storage from a masking device and/or a masking library, as described elsewhere herein.

Secure storage 440 may be implemented on a cloud computing system at least partially integrated with cloud computing system 402 (e.g., as computing hardware 403) or distinct from cloud computing system 402 (e.g., as a standalone server). In some implementations, the secure storage 440 may include one or more devices (e.g., one or more servers) that are not part of a cloud computing system, such as device 500 of FIG. 5, which may include a standalone server or another type of computing device. The secure storage 440 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The secure storage 440 may securely (e.g., using encryption) store a set of data before providing the set of data to a masking device and/or a masking library for output to a storage device, as described elsewhere herein.

User device 450 may include one or more devices capable of receiving indications associated with masking of a set of data. The user device 450 may include a communication device. For example, the user device 450 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The user device 450 may receive indications output by a masking device and/or a masking library, as described elsewhere herein. Additionally, or alternatively, the user device 450 may instruct the input device 410 and/or the secure storage 440 to provide a set of data to the masking device and/or the masking library or may instruct the masking device and/or the masking library to retrieve the set of data from the input device 410 and/or the secure storage 440, as described elsewhere herein.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
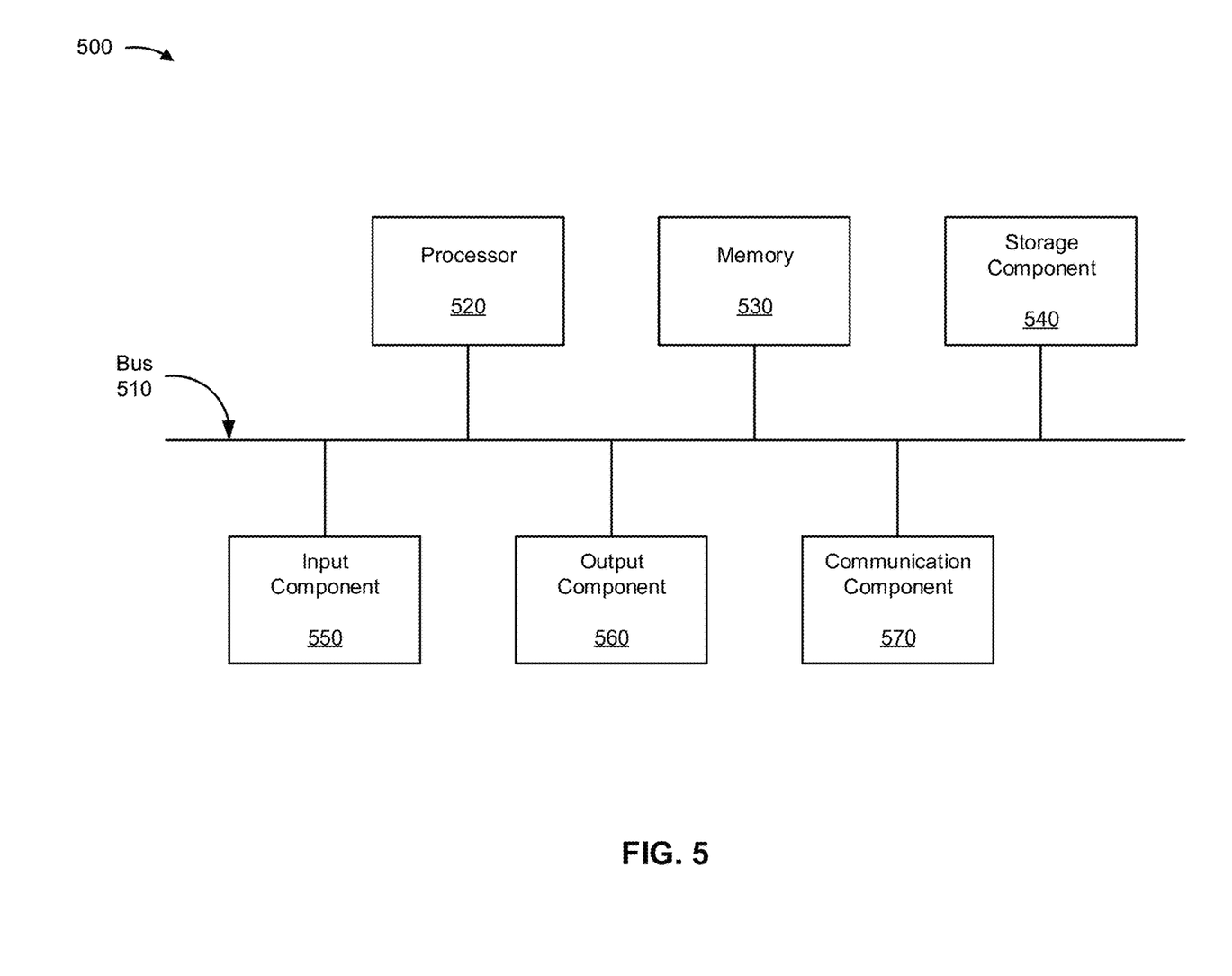
FIG. 5 is a diagram of example components of one or more devices of FIG. 4.

FIG. 5 is a diagram of example components of a device 500, which may correspond to an input device, a data store, a secure storage, and/or a user device. In some implementations, an input device, a data store, a secure storage, and/or a user device may include one or more devices 500 and/or one or more components of device 500. As shown in FIG. 5, device 500 may include a bus 510, a processor 520, a memory 530, a storage component 540, an input component 550, an output component 560, and a communication component 570.

Bus 510 includes a component that enables wired and/or wireless communication among the components of device 500. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform a function. Memory 530 includes a RAM, a read-only memory (ROM), and/or another type of memory (e.g., a flash memory, a magnetic memory, and/or an optical memory).

Storage component 540 stores information and/or software related to the operation of device 500. For example, storage component 540 may include a hard disk drive, a magnetic disk drive, an optical disk drive, a solid state disk drive, a compact disc, a digital versatile disc, and/or another type of non-transitory computer-readable medium. Input component 550 enables device 500 to receive input, such as user input and/or sensed inputs. For example, input component 550 may include a touch screen, a keyboard, a keypad, a mouse, a button, a microphone, a switch, a sensor, a global positioning system component, an accelerometer, a gyroscope, and/or an actuator. Output component 560 enables device 500 to provide output, such as via a display, a speaker, and/or one or more light-emitting diodes. Communication component 570 enables device 500 to communicate with other devices, such as via a wired connection and/or a wireless connection. For example, communication component 570 may include a receiver, a transmitter, a transceiver, a modem, a network interface card, and/or an antenna.

Device 500 may perform one or more processes described herein. For example, a non-transitory computer-readable medium (e.g., memory 530 and/or storage component 540) may store a set of instructions (e.g., one or more instructions, code, software code, and/or program code) for execution by processor 520. Processor 520 may execute the set of instructions to perform one or more processes described herein. In some implementations, execution of the set of instructions, by one or more processors 520, causes the one or more processors 520 and/or the device 500 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
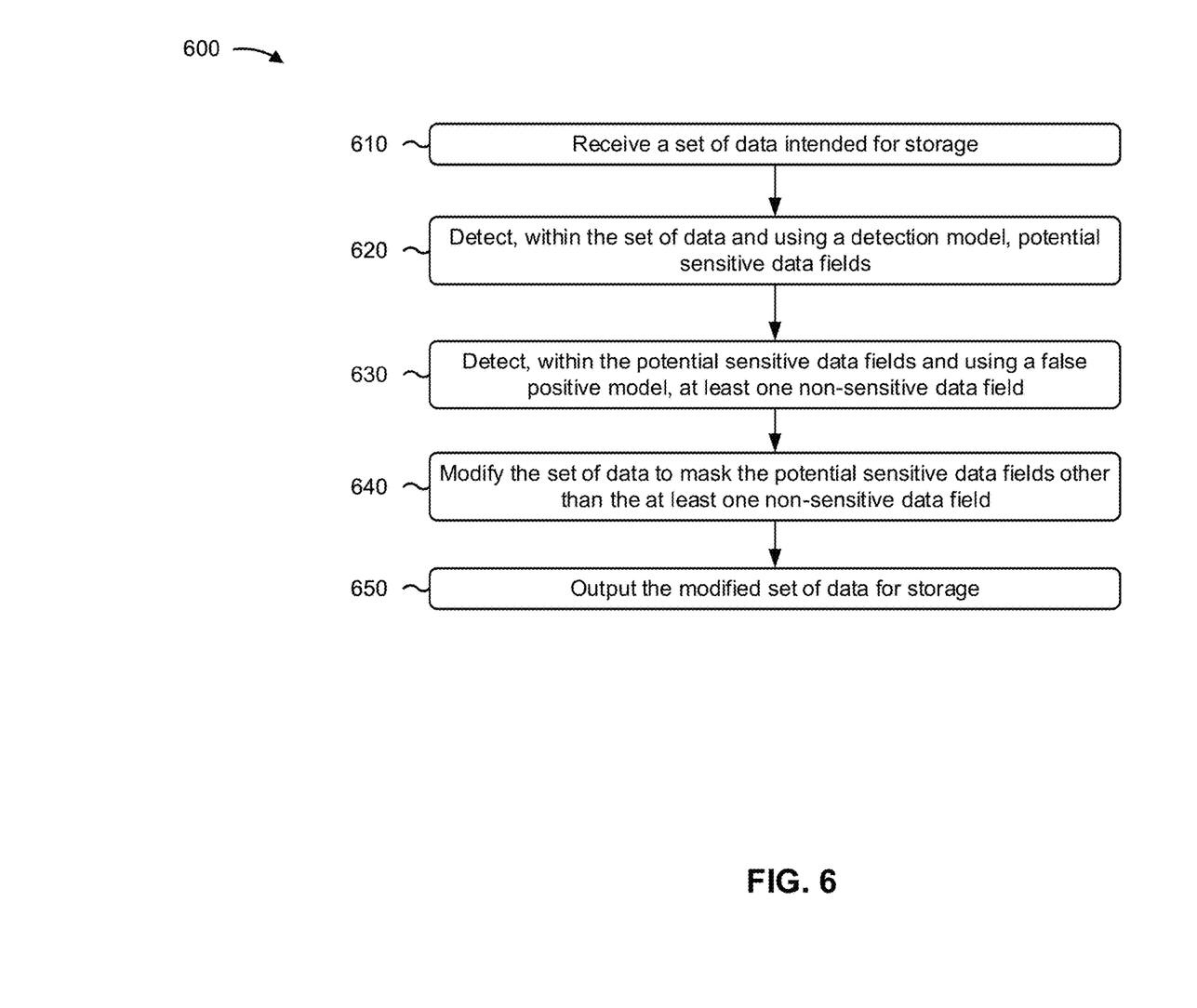
FIG. 6 is a flowchart of an example process relating to automated data masking with false positive detection and avoidance.

FIG. 6 is a flowchart of an example process 600 associated with automated data masking with false positive detection and avoidance. In some implementations, one or more process blocks of FIG. 6 may be performed by a masking device (e.g., masking device 401). In some implementations, one or more process blocks of FIG. 6 may be performed by another device or a group of devices separate from or including the masking device, such as input device 410, data store 430, secure storage 440, and/or user device 450. Additionally, or alternatively, one or more process blocks of FIG. 6 may be performed by one or more components of device 500, such as processor 520, memory 530, storage component 540, input component 550, output component 560, and/or communication component 570.

As shown in FIG. 6, process 600 may include receiving a set of data intended for storage (block 610). For example, the set of data may be intended for inclusion in a data store. As further shown in FIG. 6, process 600 may include detecting, within the set of data and using a detection model, a set of potential sensitive data fields (block 620). For example, the detection model may use data type matching, pattern matching, and/or keyword matching, as described elsewhere herein. As further shown in FIG. 6, process 600 may include detecting, within the potential sensitive data fields and using a false positive model, at least one non-sensitive data field (block 630). For example, the false positive model may use contextual analysis, as described elsewhere herein. As further shown in FIG. 6, process 600 may include modifying the set of data to mask the potential sensitive data fields other than the at least one non-sensitive data field (block 640). For example, the masking device may mask first data included in the set of potential sensitive data fields other than the at least one non-sensitive data field and refrain from masking second data included in the at least one non-sensitive data field. Thus, the masking device may generate a modified set of data based on masking the first data and refraining from masking the second data. As further shown in FIG. 6, process 600 may include outputting the modified set of data for storage (block 650). For example, the set of data may be output to the data store.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for processing and managing data to mask sensitive information and minimize false positives, the system comprising:
one or more memories; and
one or more processors, coupled to the one or more memories, configured to:
receive a data set intended for inclusion in a data store;
analyze the data set using a detection model to identify at least one potential sensitive data field, wherein the detection model utilizes at least one of:
a correspondence between one or more predefined data types and data types within the data set, or
a correspondence between one or more predefined data patterns and data patterns within the data set;
determine, within the set of data, a set of characters within a predefined range of a median character in the at least one potential sensitive data field;
utilize a false positive model to identify, within the at least one potential sensitive data field, at least one non-sensitive data field by analyzing the set of characters for patterns, words, or phrases that fall within the predefined range of the median character, wherein the false positive model employs contextual analysis to compare characters, phrases, or data patterns from a reference set to characters, phrases, or data patterns within the data set;
alter the data set to mask the potential sensitive data fields other than the at least one non-sensitive data field; and
output the altered data set to the data store.

2. The system of claim 1, wherein the one or more processors, to analyze the data set to identify potential sensitive data fields, are configured to:
apply pattern detection based on one or more first patterns to identify a first subset of the potential sensitive data fields, and
apply pattern detection based on one or more second patterns to identify a second subset of the potential sensitive data fields; and
wherein the one or more processors, to utilize the false positive model to identify the at least one non-sensitive data field, are configured to:

apply contextual analysis to a first subset of characters not associated with the first subset of the potential sensitive data fields, and apply contextual analysis to a second subset of characters not associated with the second subset of the potential sensitive data fields.

3. The system of claim 2, wherein the contextual analysis is applied using a particular function of a masking library, wherein the particular function receives the potential sensitive data fields as input.

4. The system of claim 2, wherein the one or more processors are further configured to:

receive, from a user, an indication of the one or more first patterns and an indication of the one or more second patterns.

5. The system of claim 1, wherein the contextual analysis comprises identifying one or more stored characters adjacent to the potential sensitive data fields, identifying one or more stored phrases within a threshold number of characters from the potential sensitive data fields, or identifying one or more stored data patterns within the threshold number of characters from the potential sensitive data fields.

6. The system of claim 1, wherein the detection model is further configured using keyword matching to identify a correspondence between one or more stored phrases and one or more phrases included in the data set.

7. The system of claim 1, wherein the one or more processors are further configured to:

track a quantity associated with the potential sensitive data fields and a quantity associated with the at least one non-sensitive data field; and output an indication based on the quantity associated with the potential sensitive data fields and the quantity associated with the at least one non-sensitive data field.

8. A method of automatically masking sensitive data and detecting and avoiding false positives, comprising:

receiving, by a device, a data set intended for storage;

detecting, by the device, within the data set, a set of potential sensitive data fields using a detection model configured with data type matching or pattern matching;

identifying, by the device, within the data set, a set of characters within a threshold quantity of characters of at least one character included in the set of potential sensitive data fields, wherein the at least one character comprises a median character corresponding to the set of potential sensitive data fields;

utilizing, by the device, contextual analysis to identify false positives within the set of potential sensitive data fields, wherein patterns or phrases within the threshold quantity of characters of the median character for each potential sensitive data field are analyzed to identify the false positives;

masking, by the device, data included in the set of potential sensitive data fields, excluding the false positives;

generating, by the device, a modified data set based on the masking of the data in the potential sensitive data fields; and outputting, by the device, the modified data set for storage.

9. The method of claim 8, wherein the data set is received based on user input prior to being provided to a storage device, wherein the modified data set is output to the storage device for storage, and wherein the data set is deleted without being provided to the storage device.

10. The method of claim 8, wherein the contextual analysis is applied using a particular function of a masking library, wherein the particular function receives the set of potential sensitive data fields as input.

11. The method of claim 8, wherein detecting the set of potential sensitive data fields comprises:

applying pattern detection using a trained machine learning model.

12. The method of claim 8, further comprising:

tracking a frequency count of identified potential sensitive data fields and identified false positives; and updating a detection model based on the frequency count to enhance accuracy in future detections.

13. The method of claim 12, wherein the detection model is configured to apply keyword matching to identify a correspondence between one or more stored phrases and one or more phrases included in the data set.

14. A non-transitory computer-readable medium storing a set of instructions for masking sensitive data and detecting and avoiding false positives, the set of instructions comprising:

one or more instructions that, when executed by one or more processors of a device, cause the device to:

provide at least one first function that receives a set of data as input, detects potential sensitive data fields within the set of data using at least one of pattern matching or data type matching, and outputs the potential sensitive data fields;

provide at least one second function that receives the potential sensitive data fields as input, detects false positives corresponding to at least one non-sensitive data field within the potential sensitive data fields using contextual analysis that is applied in accordance with one or more threshold numbers of characters of at least one median character included within the potential sensitive data fields, wherein the contextual analysis is used to detect the false positives by identifying within the set of characters at least one of one or more patterns or one or more words or phrases that are within the one or more threshold number of characters of the at least one median character, and outputs the at least one non-sensitive data field; and provide at least one third function that modifies the set of data to mask the potential sensitive data fields other than the at least one non-sensitive data field and outputs the modified set of data.

15. The non-transitory computer-readable medium of claim 14, wherein the at least one first function comprises a plurality of first functions, and wherein the one or more instructions, when executed by the one or more processors, further cause the device to:

select, based on input from a user, a subset of the plurality of first functions to apply to the set of data.

16. The non-transitory computer-readable medium of claim 15, wherein the at least one second function comprises a plurality of second functions, and wherein the one or more instructions, when executed by the one or more processors, further cause the device to:

select, based on the subset of the plurality of first functions, a corresponding subset of the plurality of second functions to apply to the potential sensitive data fields.

17. The non-transitory computer-readable medium of claim 14, wherein:

the one or more instructions, that cause the device to provide at least one first function, cause the device to:

provide one first function that applies pattern detection based on one or more first patterns to identify a first subset of the potential sensitive data fields, and provide another first function that applies pattern detection based on one or more second patterns to identify a second subset of the potential sensitive data fields; and the one or more instructions, that cause the device to provide at least one second function, cause the device to: provide one second function that applies contextual analysis to a first set of characters not included in the first subset of the potential sensitive data fields, and provide another second function that applies contextual analysis to a second set of characters not included in the second subset of the potential sensitive data fields.

18. The non-transitory computer-readable medium of claim 17, wherein the one or more first patterns are selected based on a first data type match between a first stored data type and a data type associated with the first subset, and the one or more second patterns are selected based on a second data type match between a second stored data type and a data type associated with the second subset.

19. The non-transitory computer-readable medium of claim 14, wherein the one or more instructions, when executed by the one or more processors, further cause the device to:

track at least one quantity associated with the potential sensitive data fields or the at least one non-sensitive data field; and output, based on the at least one quantity, at least one of a textual output for display or a log file to a storage.

20. The non-transitory computer-readable medium of claim 14, wherein the at least one first function corresponds to a flexible masking library, the at least one second function corresponds to the flexible masking library, and the at least one third function corresponds to the flexible masking library, wherein each function of the flexible masking library is called by an importing process associated with a cloud storage.

\* \* \* \* \*